(12) United States Patent
Reichold et al.

(10) Patent No.: US 6,792,637 B2
(45) Date of Patent: Sep. 21, 2004

(54) AUTOMATIC DETERGENT DISPENSING SYSTEM FOR A WAREWASHER

(75) Inventors: Kurt A. Reichold, Mukwonago, WI (US); David A. Uhen, Burlington, WI (US)

(73) Assignee: U.S. Chemical Corporation, Brookfield, WI (US)

( * ) Notice: Subject to any disclaimer, the term of this patent is extended or adjusted under 35 U.S.C. 154(b) by 287 days.

(21) Appl. No.: 10/040,512

(22) Filed: Jan. 8, 2002

(65) Prior Publication Data

US 2003/0127110 A1 Jul. 10, 2003

(51) Int. Cl.⁷ ............................................. D06F 39/02
(52) U.S. Cl. ................... 8/159; 68/12.12; 68/12.18; 68/17 R; 68/207; 68/12.02
(58) Field of Search ................ 8/158, 159; 68/12.01, 68/12.02, 12.12, 12.18, 13 R, 17 R, 207; 134/56 R, 57 R, 57 D, 56 D, 58 D, 113

(56) References Cited

U.S. PATENT DOCUMENTS

| | | | |
|---|---|---|---|
| 3,398,756 A | * | 8/1968 | Kauffman |
| 4,011,101 A | | 3/1977 | Levenback et al. |
| 4,076,146 A | * | 2/1978 | Lausberg et al. |
| 4,208,890 A | * | 6/1980 | Wood |
| 4,509,543 A | | 4/1985 | Livingston et al. |
| 4,733,798 A | | 3/1988 | Brady et al. ................ 222/23 |
| 4,735,219 A | * | 4/1988 | Seeland |
| 4,756,321 A | | 7/1988 | Livingston et al. ........... 134/56 |
| 4,956,887 A | | 9/1990 | Hakulinen ................ 8/158 |
| 5,439,019 A | * | 8/1995 | Quandt et al. |
| 5,500,050 A | * | 3/1996 | Chan et al. |
| 5,603,233 A | * | 2/1997 | Erickson et al. |
| 5,647,231 A | * | 7/1997 | Payne et al. |
| 5,681,400 A | | 10/1997 | Brady et al. |
| 5,870,906 A | * | 2/1999 | Denisar |
| 5,960,804 A | * | 10/1999 | Cooper et al. |
| 6,058,743 A | * | 5/2000 | Fujii et al. |

FOREIGN PATENT DOCUMENTS

| | | | | |
|---|---|---|---|---|
| DE | 295 11 175 U1 | 1/1996 | ............ | A47L/15/42 |
| EP | 0 509 586 A1 | 10/1992 | ............ | D06F/39/00 |
| GB | 2 217 050 A | 10/1989 | ............ | D06F/39/02 |
| JP | 11-258244 | * | 9/1999 | |
| WO | WO 93/17611 | 9/1993 | ............ | A47L/15/44 |
| WO | WO 98/26704 | 6/1998 | ............ | A47L/15/44 |

OTHER PUBLICATIONS

Europena Office 119,057 9–1984.*

* cited by examiner

Primary Examiner—Frankie L. Stinson
(74) Attorney, Agent, or Firm—George E. Haas; Quarles & Brady LLP

(57) ABSTRACT

An apparatus dispenses detergent into a warewasher from a reservoir wherein a flow control device controls the flow of the detergent. A sensor measures the electrical conductivity of water within the warewasher and produces a conductivity measurement. A controller operates the flow control device in a first mode in which the quantity of detergent dispensed into the warewasher is determined in response to the electrical conductivity of the water. If the conductivity measurement is determined to be unreliable, the controller operates in a second mode in which a predefined quantity of detergent is dispensed into the warewasher. The reliability of the conductivity measurement is determined based on the amount that the conductivity changes upon detergent being added to the warewasher.

27 Claims, 3 Drawing Sheets

AUTOMATIC DETERGENT DISPENSING SYSTEM FOR A WAREWASHER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to automatic warewashers for cleaning dishes, glasses, pots, pans, kitchen utensils and the like; and in particular to apparatus for automatically dispensing detergent into the warewasher.

2. Description of the Related Art

Commercial kitchens have equipment to clean and sanitize dishes, glassware, and cooking utensils which are collectively referred to herein as "kitchen ware." Such equipment, which is commonly known as a "warewasher" or "dishwasher," has a cabinet defining an internal chamber into which trays of kitchen ware are placed for washing. A washing and rinsing apparatus within the chamber includes a plurality of nozzles from which water sprays onto the kitchen ware being washed. The lower part of the cabinet forms a tank that collects the water which then is repeatedly circulated through the nozzles by a pump during the wash cycle. Then fresh water from an external supply line is fed through the nozzles during the rinse cycle. As the rinse water flows into the tank, some of the tank water overflows into a drain thus replacing some of the water from the wash cycle. The water is not completely drained from the tank between washing operations and thus contain detergent from a previous wash cycle.

A relatively large amount of detergent must be added when the tank is initially filled with water prior to washing the first batch of dishes and glasses. Thereafter, additional detergent has to be added in smaller quantities at the start of each wash cycle to replenish the detergent that drained away during the rinse cycle.

Systems have been devised to automatically add detergent into the cabinet. The basic automatic system always added the same predefined quantity of detergent at the start of each wash cycle. This quantity remained constant regardless of variation in water quality, soil condition of the dishes, and the amount of detergent remaining in the tank water. Thus these systems often added too much or too little detergent. Adding more than the necessary amount of detergent is wasteful and expensive, while adding less detergent than is needed results in the kitchen ware not being properly cleaned.

An improved automatic detergent control system used a probe that measured the conductivity of the water in the tank. Because the detergent is an alkali, the water conductivity varied with the detergent concentration. Therefore, by sensing the water conductivity, the control system was able to determine how much detergent needed to be added at the beginning of a wash cycle. Although this system resulted in more economical use of detergent, the conductivity probe became fouled over time by the build-up of lime from the water. Thereafter, the probe provided false indications of the water conductivity because the lime deposits reduced the conductivity of the probe. Thus an inaccurately low conductivity measurement was produced that caused more detergent to be added than was necessary. The solution to this problem was to clean the conductivity probe periodically by hand with a lime dissolving chemical, usually a weak acid solution. However, until that cleaning occurred the system continued to consume a greater amount of detergent than was needed.

SUMMARY OF THE INVENTION

An apparatus for dispensing detergent into a warewasher has a reservoir that contains the detergent. A flow control device is coupled to the reservoir and controls the flow of detergent into the warewasher. A sensor detects an amount of detergent present in water held in a tank of the warewasher. In the preferred embodiment of the apparatus, the sensor measures the electrical conductivity of the water, which varies with changes in the concentration of detergent.

A controller, connected to the sensor, operates the flow control device to dispense detergent into the warewasher. The controller has a first mode of operation in which a quantity of detergent being dispensed is determined in response to the amount of detergent detected by the sensor. The quantity being dispensed brings the amount of detergent in the tank water to a desired level to properly clean the kitchen ware. In a second mode of operation of the controller, a predefined quantity of detergent always is dispensed into the warewasher without reference to the amount of detergent present in the tank water at the commencement of a wash cycle. The controller selects between the first and second modes in response to a determination regarding reliability of operation of the sensor.

In the preferred embodiment, the operation of the sensor is determined to be reliable when the measurement of the electrical conductivity changes by at least a given amount upon detergent being dispensed into the warewasher. Otherwise the sensor operation is determined to be unreliable.

DETAILED DESCRIPTION OF THE INVENTION

Figure 1:
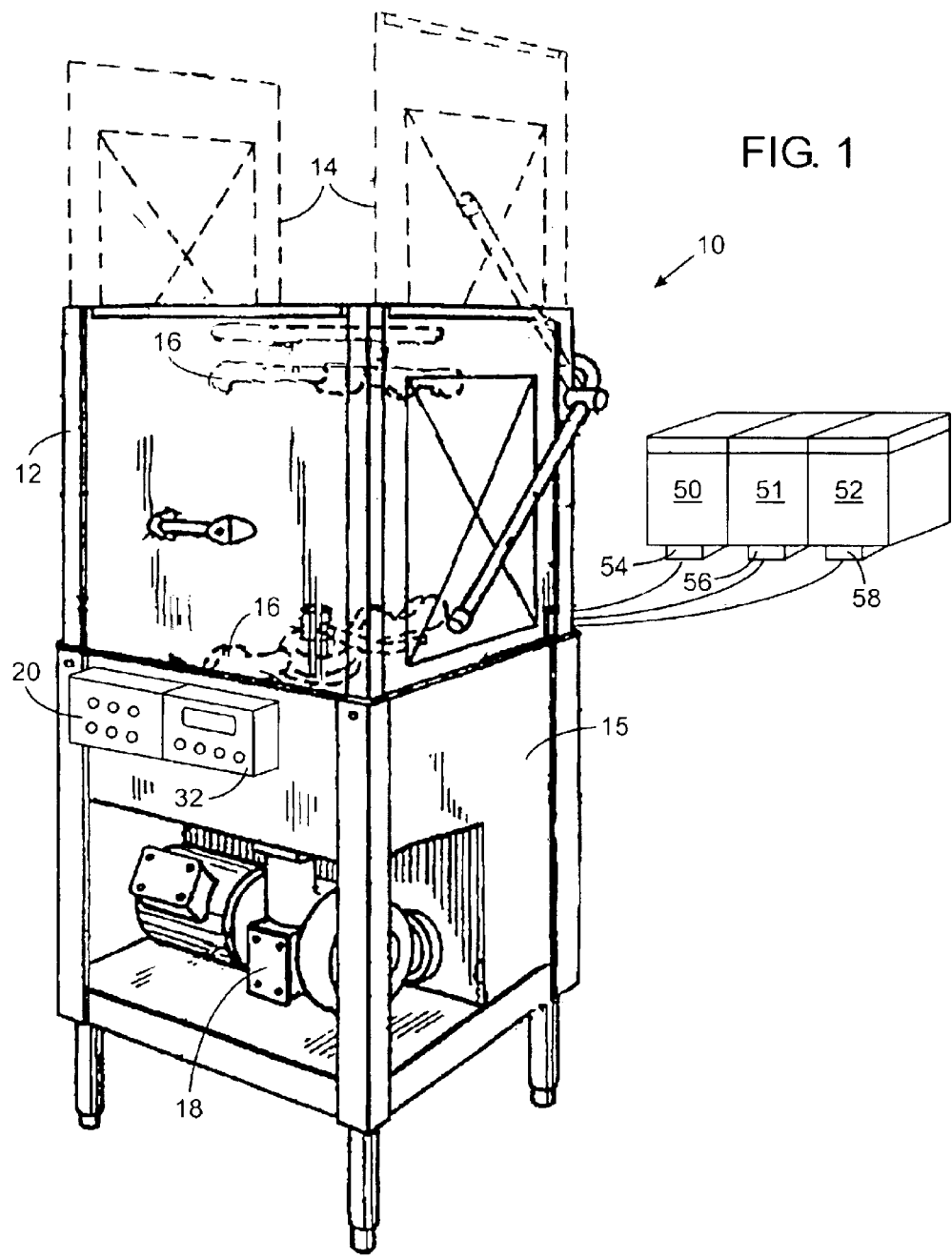
FIG. 1 is an isometric illustration of a commercial warewasher which incorporates the present invention.

With initial reference to FIG. 1, a commercial kitchen warewasher 10 has a cabinet 12 defining a chamber into which kitchen ware is placed for washing. Two doors 14 are slidably mounted on the cabinet 12 to close openings through which racks of glasses and dishes pass into and out of the chamber. The chamber contains standard washing and rinsing apparatus that includes a plurality of nozzles 16 that spray water supplied by a wash pump 18. A region at the bottom of the cabinet 12 forms a tank 15 into which the water drains from the kitchen ware and which holds a volume of water between washing operations.

Figure 2:
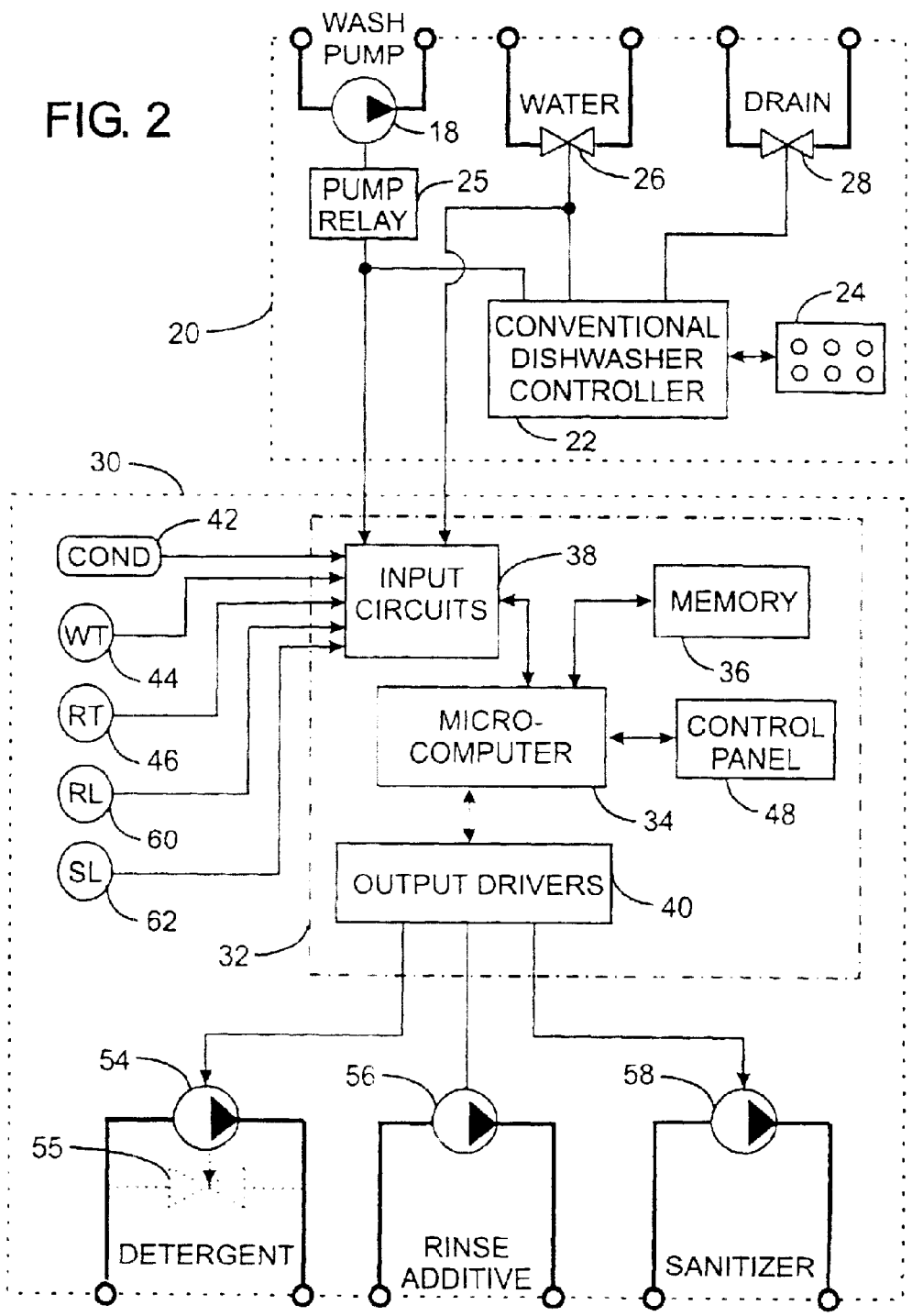
FIG. 2 is a schematic representation of control circuitry for the commercial warewasher.

Referring to FIG. 2, the warewasher 10 has a conventional control system 20 that employs a standard controller 22, such as a timer in which a motor drives a cam assembly that operates a plurality of electrical switches. The speed of the motor and the shape of the cam assembly determine the sequence and time periods that other components are activated by the switches during a cleaning operation. Warewashers with microcomputer based controllers also are available. The cleaning operation for a given batch of kitchen ware includes individual cycles for washing, rinsing, and sanitizing the kitchen ware. A control panel 24 provides switches by which the operator starts a cleaning operation and selects operational functions to be performed.

The controller 22 produces an output signal that operates a solenoid water valve 26 to initially add water to the tank 15 at the bottom of the cabinet 12 and supply water to the nozzles 16 during the rinse cycle. Another output signal from the controller 22 activates a solenoid drain valve 28 to drain the water from the tank 15 at the end of the business day. A relay 25 enables the controller 22 to activate the wash pump 18 during the wash cycle.

A detergent and additive dispensing system 30 also is provided on the warewasher 10. This dispensing system 30 has a controller 32 which includes a microcomputer 34 which executes a program that is stored in memory 36. That program defines the operation of the dispensing system. The controller 32 includes input circuits 38 that receive signals from various devices on the warewasher 10, as will be described. A number of output drivers 40 are connected to devices, such as pumps and valves, which are to be activated by the controller 32.

The dispensing system 30 receives signals from the warewasher control system 20. Specifically, one signal indicates whether the pump relay 25 is activated, thereby providing an indication of whether the warewasher is in the wash cycle. Another input is provided from the water valve 26 which indicates that a rinse cycle is occurring. The dispensing system 30 has a conductivity sensor 42 which is placed below the water line of the tank 15 to detect the conductivity of the water held therein. A water temperature sensor 44 is co-located with the conductivity sensor 42 to provide a signal indicating the temperature of the water within tank 15. Another temperature sensor 46 is mounted in a conduit that carries water during the rinse cycle and thus provides an indication of the rinse water temperature.

Referring again to FIG. 1, containers 50, 51 and 52 are provided to store detergent, a rinse additive and a sanitizer chemical, respectively. Each of the containers 50, 51 and 52 has a separate pump 54, 56 and 58 associated therewith to convey the respective solution through tubes to the cabinet 12 of the warewasher 10 when the respective pump is energized. As shown in FIG. 2, the pumps 54, 56 and 58 are controlled by output drivers 40 of the dispensing controller 32. A control panel 48 enables the operator to monitor and direct the chemical dispensing.

The dispensing controller 32 also has a sensor 60 which monitors the level of the rinse additive within container 51 and another level sensor 62 which provides an electrical indication of how much sanitizer is within container 52. The signals from the various level sensors, temperature sensors and conductivity sensor are applied to input circuits 38 of the dispensing controller 32.

After installation of the warewasher 10, the dispensing control system 30 should be configured. The system may be reconfigured any time after installation should it be desired to change the operating parameters. To configure the dispensing system, the operator of the warewasher presses a combination of pushbutton switches on the control panel 48 which places the controller 32 in the configuration mode. The operator steps the display through a list of the parameters which can be configured and uses the pushbutton switches to select a parameter and define its setting.

The present invention relates to dispensing the detergent and the relevant control parameters include a value representing the desired concentration of detergent in the tank water. The desired concentration has a value on a numerical scale between 0 and 250. Prior to entering the configuration mode, the operator must determine the desired configuration setting for the detergent concentration. This is accomplished by the operator manually charging the wash tank 15 with an amount of detergent that produces the desired concentration as determined by titration. Then, the warewasher is operated in a wash cycle to thoroughly mix the detergent in the water. Upon completion of the wash cycle, the conductivity probe measures the conductivity of the tank water and the microcomputer 34 uses the conductivity measurement to calculate a detergent concentration value. That calculated concentration value is displayed on the control panel 48 and recorded by the operator. Subsequently in the configuration mode, the operator steps to the concentration parameter and enters the recorded value for the detergent concentration.

As will be described, the dispensing system 30 has a "probe-less mode" of operation which is employed upon the conductivity measured by the probe 42 being deemed unreliable. In the probe-less mode, a first predefined amount of detergent is dispensed both upon initial filling of the tank 15 and a smaller second predefined amount is dispensed at the commencement of each wash cycle. These two predefined amounts of detergent are defined during the configuration process. The settings of the configuration parameters are stored within the memory 36 of the controller 32 and are addressed as needed by the microcomputer 34.

Figure 3:
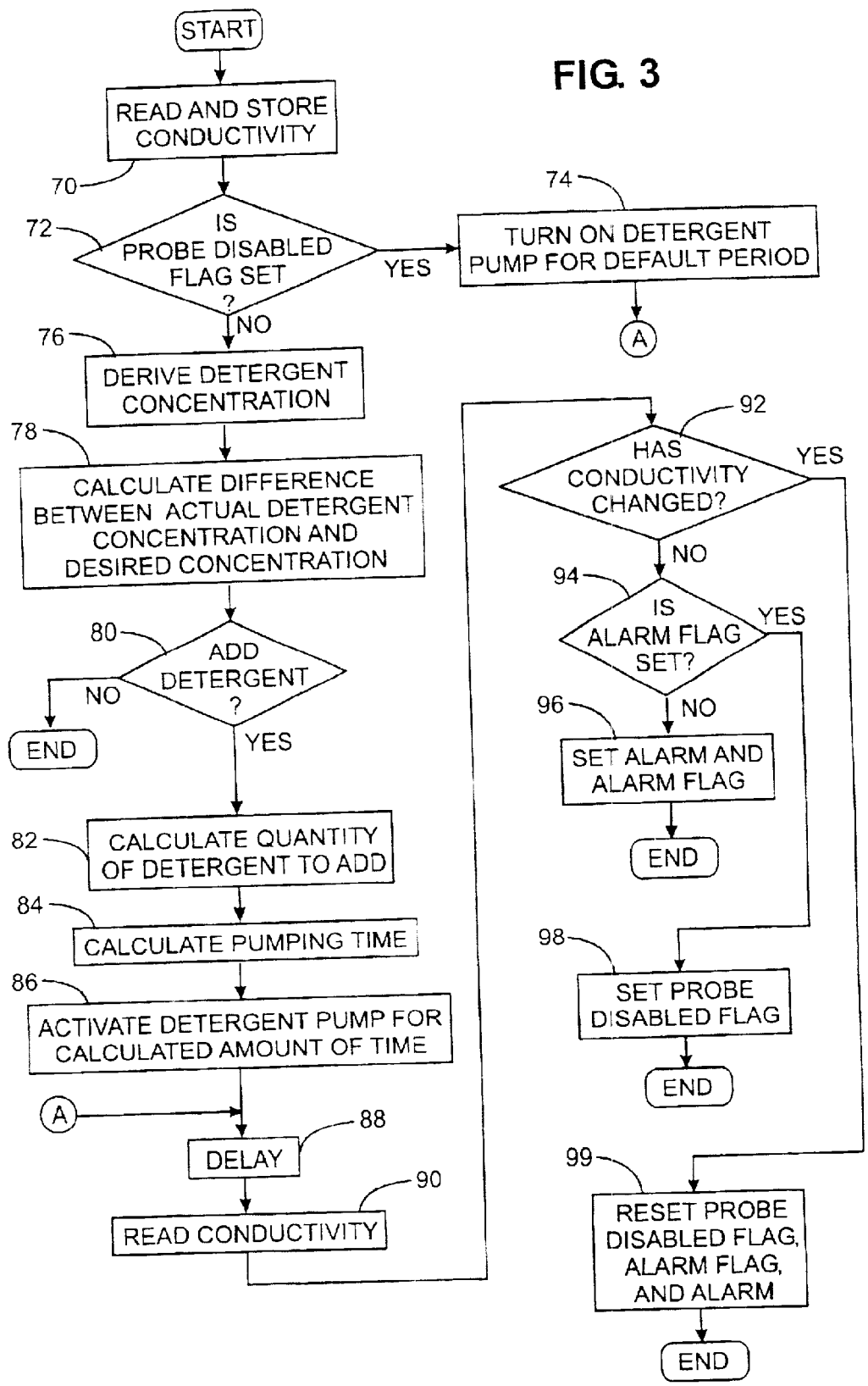
FIG. 3 is a flowchart of the process by which detergent is dispensed into the warewasher.

Once the dispensing control system 30 has been configured, the warewasher can be placed into operation with automatic dispensing of the detergent, rinse additive and sanitizer from containers 50–52. As noted previously, the present invention relates to the automated dispensing of the detergent. Each time the control system 20 of the warewasher 10 enters a wash cycle, the conventional dishwasher controller 22 activates the pump relay 25. In addition to energizing the wash pump 18, this action sends a signal to the controller 32 of the automatic dispensing system 30. The microcomputer 34 recognizes this signal and responds by activating a software routine depicted in FIG. 3.

That software routine commences at step 70 with the microcomputer reading the tank water conductivity, as indicated by the signal from sensor 42, and stores the conductivity value in memory 36. Then at step 72, a check is made whether a probe disabled flag was set in memory 36 during previous operation of the warewasher 10. This flag is set when a determination is made that the signal from the conductivity probe is unreliable as may occur due to excessive lime build-up. If the probe disabled flag is set, the microcomputer 34 controls the dispensing of detergent in the probe-less mode which does not use the conductivity measurements. In the probe-less mode, the software execution branches to step 74 where the detergent pump 54 is turned on for a fixed period of time required to dispense the predefined quantity of liquid detergent as specified by the configuration parameters. The pump 54 feds the detergent from the container 50 into the tank 15 of the warewasher 10 where the detergent mixes with the tank water and the resultant solution is circulated through the spray nozzles 16 by the wash pump 18. When the predefined quantity of liquid detergent has been dispensed, the detergent pump 54 is deactivated and the program execution jumps to step 88, which will be discussed hereinafter.

If the probe disable flag is not found set at step 72, the software execution branches to step 76 and enters the "probe mode" of operation. At this step, the microcomputer 34 dynamically derives a detergent concentration level from the conductivity measurement provided by probe 42. Next at step 78, the microcomputer calculates the difference between the derived detergent concentration level and the desired concentration level set during the configuration process. This difference then is used at step 80 to determine whether detergent needs to be added. If that is not the case, execution of the software routine terminates until the next wash cycle.

If additional detergent is required, the program execution advances from step 80 to step 82 where the quantity of detergent to be added is determined based on the difference between the actual and desired concentration levels and the fixed volume of water in the tank 15. The period of time that the detergent pump must be activated to supply this quantity of detergent is calculated at step 84. Then at step 86, the microcomputer 34 activates the detergent pump 54, via one of the output drivers 40, for the calculated period of time.

Thereafter, the software execution delays for a period of time at step 88 to allow the newly added detergent to be distributed throughout the volume of water in the tank 15 so that the concentration of detergent reaches equilibrium. Then at step 90, the microcomputer 34 again reads the conductivity indicated by probe 42 and at step 92 compares this new conductivity level with the previous conductivity level that was stored at step 70. This comparison indicates whether the conductivity of the tank water has increased significantly as should have occurred due to the additional detergent.

Failure of the tank water conductivity to increase significantly often results from the detergent container 50 being empty and needing to be refilled. Thus, if the conductivity has not increased by at least a predetermined amount, the dispensing process branches to step 94 where a determination is made whether an alarm flag had not set, the program execution activates an audible detergent alarm at step 96 to alert the operator that the container 50 may need to be refilled with detergent. At the same time, the alarm flag is set to provide an indication the alarm condition, even after the operator refills the detergent container 50 and resets the audible detergent alarm via the operator control panel 48. The execution of routine then terminates until the next wash cycle.

However, if the alarm flag was found set at step 94, it is assumed that the operator had previously responded to the alarm by inspecting the detergent container 50 and refilling it if necessary. Therefore, a consecutive occurrence of unchanged conductivity probably did not result from a lack of detergent and likely resulted from a malfunctioning conductivity probe 42. As noted previously, lime from the water becomes deposited over time on the conductivity probe and adversely affects accurate conductivity measurements. Excessive lime deposits can result in the measured conductivity remaining unchanged of failing to increase significantly, even though detergent is being added to the tank 15. Thus, if a alarm flag was found previously set at step 94, the controller 32 concludes that the conductivity probe 42 cannot be relied upon to control the dispensing of detergent and the probe-less mode of operation should be employed. This mode change is indicated by setting the probe disabled flag and alerting the operator, at step 98. Therefore, during the next wash cycle, the probe disabled flag will be found to be set at step 72 causing the controller 32 to branch into the probe-less mode of operation in step 74, as previously described.

Steps 88 through 99 are executed after step 74 in the probe-less mode. Therefore should the conductivity be found to have changed at step 92, the control system 30 concludes that the probe again can be relied upon, as it may have been cleaned or another malfunction rectified. Thus, a change in conductivity detected at any time at step 92 causes the execution of step 99 where the probe disabled flag, alarm flag and the audible alarm are all reset before terminating the detergent dispensing routine. This action restores the controller operation to the probe mode and terminates any alarm indications.

The present system economically dispenses detergent on an as needed basis using the relationship between the tank water conductivity and detergent concentration. The system has the ability to detect a malfunctioning conductivity probe and automatically switch to a mode of operation that does not use the conductivity measurements. If the conductivity probe subsequently returns to reliable operation, the dispensing system automatically reverts to the mode the employs the conductivity.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. For example, although a separate controller 32 has been described for detergent dispensing, that functionality can be incorporated into a microcomputer based dishwasher controller 22. Accordingly, the scope of the invention should be determined from the following claims and not limited by the above disclosure.

We claim:

1. An apparatus for dispensing detergent into a warewasher which has wash cycle, said apparatus comprising:
   a reservoir for containing the detergent;
   a flow control device which couples the reservoir to the warewasher and controls flow of the detergent into the warewasher;
   a sensor which produces a signal indicating an amount of detergent present in water within the warewasher; and
   a controller operatively connected to the flow control device and the sensor to control dispensing detergent into the warewasher, wherein the controller has a first mode of operation in which a quantity of detergent dispensed into the warewasher is determined in response to the amount of detergent indicated by the sensor, and has a second mode of operation in which a predefined quantity of detergent is dispensed into the warewasher, the controller switching between the first and second modes in response to a determination regarding reliability of operation of the sensor.

2. The apparatus as recited in claim 1 wherein the sensor detects electrical conductivity of water within the warewasher.

3. The apparatus as recited in claim 2 wherein the controller switches between the first and second modes in response to an amount that the electrical conductivity changes.

4. The apparatus as recited in claim 2 wherein the controller switches between the first and second modes in response to a comparison of a plurality of conductivity measurements provided by the sensor.

5. The apparatus as recited in claim 2 wherein the controller switches from the first mode to the second mode when the electrical conductivity fails to change by at least a predetermined amount in response to detergent being dispensed to the warewasher.

6. The apparatus as recited in claim 2 wherein the controller switches from the second mode to the first mode when the electrical conductivity changes more than a predetermined amount.

7. The apparatus as recited in claim 2 wherein the controller employs the electrical conductivity to derive a value indicating concentration of the detergent present in the water.

8. The apparatus as recited in claim 7 further comprising a storage device connected to the controller and storing a designation of a desired level of detergent concentration; and wherein the controller determines the quantity of detergent to dispense in response to comparing the level of concentration of the detergent derived by the controller to the desired level of detergent concentration.

9. The apparatus as recited in claim 1 further comprising a storage device connected to the controller and storing a designation of a desired amount of detergent; and wherein the controller determines the quantity of detergent to dispense in response to comparing the amount of detergent present in the water to the desired amount of detergent.

10. The apparatus as recited in claim 1 wherein the controller operates the flow control device to dispense detergent in response to the warewasher operating in the wash cycle.

11. The apparatus as recited in claim 1 further comprising an input device connected to the controller and enabling an operator to specify the predefined quantity of detergent.

12. The apparatus recited in claim 1 wherein the flow control device is a pump.

13. The apparatus recited in claim 1 wherein the flow control device is a valve.

14. An apparatus for dispensing detergent into a warewasher which has wash cycle, said apparatus comprising:
    a reservoir for containing the detergent;
    a flow control device which couples the reservoir to the warewasher and controls flow of the detergent into the warewasher; and
    a sensor that measures electrical conductivity of water within the warewasher; and
    a controller connected to the sensor and operating the flow control device to dispense detergent into the warewasher, the controller has a first mode of operation in which a quantity of detergent dispensed into the warewasher is determined in response to the electrical conductivity of the water, and has a second mode of operation in which a predefined quantity of detergent is dispensed into the warewasher, wherein the controller switches between the first and second modes in response to a determination regarding reliability of electrical conductivity measurements provided by the sensor.

15. The apparatus as recited in claim 14 wherein the controller switches between the first and second modes in response to a comparison of a plurality of electrical conductivity measurements provided by the sensor.

16. The apparatus as recited in claim 14 wherein the controller switches from the first mode to the second mode when the electrical conductivity fails to increase at least a predetermined amount upon detergent being dispensed into the warewasher.

17. The apparatus as recited in claim 14 wherein the controller switches from the second mode to the first mode when the electrical conductivity increases by at least a predetermined amount.

18. The apparatus as recited in claim 14 wherein the controller in the first mode employs the electrical conductivity to derive a level of concentration of the detergent present in the water, and determines the quantity of detergent to dispense in response to comparing the level of concentration of the detergent to a desired level of detergent concentration.

19. The apparatus as recited in claim 18 further comprising an input device connected to the controller and enabling an operator to specify the desired level of detergent concentration.

20. The apparatus as recited in claim 14 further comprising an input device connected to the controller and enabling an operator to specify the predefined quantity of detergent.

21. The apparatus as recited in claim 14 wherein the controller operates the flow control device to dispense detergent in response to the warewasher operating in the wash cycle.

22. A method of dispensing detergent into a warewasher which has wash cycle, said method comprising:
    storing detergent in a reservoir;
    coupling the reservoir to the warewasher by a flow control device which controls flow of the detergent into the warewasher;
    sensing electrical conductivity of water within the warewasher to produce a conductivity measurement;
    determining reliability of the conductivity measurement;
    when the conductivity measurement is determined to be reliable, dispensing a quantity of detergent into the warewasher wherein the quantity is determined in response to the electrical conductivity of the water; and
    when the conductivity measurement is determined to be unreliable, dispensing a predefined quantity of detergent into the warewasher.

23. The method as recited in claim 22 wherein the conductivity measurement is determined to be unreliable when the electrical conductivity fails to change at least a predetermined amount in response to detergent being dispensed into the warewasher.

24. The method as recited in claim 22 wherein the conductivity measurement is determined to be reliable when the electrical conductivity changes more than a predetermined amount.

25. The method as recited in claim 22 further comprising employing the conductivity measurement to derive a level of concentration of the detergent present in the water, and determining the quantity of detergent to dispense in response to comparing the level of concentration of the detergent to a desired level of detergent concentration.

26. An a control system for dispensing detergent into a warewasher which has a reservoir for containing the detergent, said control system comprising:
    a flow control device which couples the reservoir to the warewasher and controls flow of the detergent into the warewasher;
    a sensor which produces a signal indicating an amount of detergent present in water within the warewasher; and
    a controller operatively connected to the flow control device and the sensor to control dispensing detergent into the warewasher, wherein the controller has a first mode of operation in which a quantity of detergent dispensed into the warewasher is determined in response to the amount of detergent indicated by the sensor, and has a second mode of operation in which a predefined quantity of detergent is dispensed into the warewasher, the controller switching between the first and second modes in response to a determination regarding reliability of operation of the sensor.

27. The apparatus as recited in claim 26 wherein the sensor detects electrical conductivity of water within the warewasher; and the controller switches between the first and second modes in response to the electrical conductivity.

* * * * *

UNITED STATES PATENT AND TRADEMARK OFFICE
CERTIFICATE OF CORRECTION

PATENT NO. : 6,792,637 B2
DATED : September 21, 2004
INVENTOR(S) : Kurt A. Reichold et al.

It is certified that error appears in the above-identified patent and that said Letters Patent is hereby corrected as shown below:

<u>Column 5,</u>
Line 35, after "alarm flag had" insert -- been previously set by a previous finding of unchanged conductivity. If the alarm flag --.

Signed and Sealed this

Fifth Day of April, 2005

JON W. DUDAS
*Director of the United States Patent and Trademark Office*